(12) United States Patent
Spuller et al.

(10) Patent No.: US 9,162,384 B2
(45) Date of Patent: Oct. 20, 2015

(54) INJECTION NOZZLE WITH MULTI-PIECE TIP PORTION

(71) Applicant: Otto Manner Innovation GmbH, Bahlingen (DE)

(72) Inventors: Swen Spuller, Forchheim (DE); Gheorghe George Olaru, Freiburg (DE)

(73) Assignee: Otto Männer Innovation GmbH, Bahlingen (DE)

( * ) Notice: Subject to any disclaimer, the term of this patent is extended or adjusted under 35 U.S.C. 154(b) by 0 days.

(21) Appl. No.: 14/224,058

(22) Filed: Mar. 24, 2014

(65) Prior Publication Data

US 2014/0302192 A1    Oct. 9, 2014

Related U.S. Application Data

(60) Provisional application No. 61/804,602, filed on Mar. 22, 2013.

(51) Int. Cl.
| | |
|---|---|
| *B29C 45/20* | (2006.01) |
| *B29C 45/27* | (2006.01) |
| *B29C 45/17* | (2006.01) |

(52) U.S. Cl.
CPC ........... *B29C 45/278* (2013.01); *B29C 45/1734* (2013.01); *B29C 45/1735* (2013.01); *B29C 2045/2787* (2013.01); *B29K 2995/0012* (2013.01); *B29K 2995/0013* (2013.01)

(58) Field of Classification Search
CPC .................. B29C 45/1734; B29C 45/1735
USPC .................................................. 425/569, 570
See application file for complete search history.

(56) References Cited

U.S. PATENT DOCUMENTS

| 4,923,512 A * | 5/1990 | Timm et al. .................... 75/239 |
|---|---|---|
| 6,022,210 A | 2/2000 | Gunther |
| 6,164,954 A | 12/2000 | Mortazavi et al. |
| 6,245,278 B1 | 6/2001 | Lausenhammer et al. |
| 7,143,496 B2 | 12/2006 | Guenther |
| 7,458,803 B2 | 12/2008 | Bouti |
| 7,467,940 B2 | 12/2008 | Bouti |

(Continued)

OTHER PUBLICATIONS

R.E. Juarez et al, Synthesis of nanocrystalline zirconia powders for TZP ceramics by a nitrate-citrate combustion route, Feb. 2000, Journal of the Europoen Ceramic Society, pp. 133-138 (internet copy).*

(Continued)

*Primary Examiner* — Tim Heitbrink
(74) *Attorney, Agent, or Firm* — McAndrews, Held & Malloy, Ltd.

(57) ABSTRACT

A hot runner nozzle assembly includes a nozzle heater, a hot runner nozzle, a nozzle tip, a nozzle tip seal surrounding the nozzle tip and a connecting element positioned to removably couple the tip seal to the nozzle tip and to create a first contact seal between the nozzle tip and the tip seal and a second annular contact seal between the tip seal and a mold component. The nozzle tip is made or shaped via a sintering process from a metal matrix composite (MMC) material having a first coefficient of thermal expansion. The tip seal is made or shaped from a ceramic based powder material, having a second coefficient of thermal expansion that is different from the first coefficient of thermal expansion. In operation this hot runner nozzle assembly provides an improved heat profile and a reduced leakage at the tip area under a wider operating processing window.

19 Claims, 13 Drawing Sheets

(56) References Cited

U.S. PATENT DOCUMENTS

| | | |
|---|---|---|
| 7,507,081 B2 | 3/2009 | Guenther et al. |
| 7,695,271 B2 | 4/2010 | Bouti et al. |
| 7,780,434 B2 | 8/2010 | Olaru |
| 7,841,855 B2 | 11/2010 | Gunther et al. |
| 7,891,969 B2 | 2/2011 | Olaru |
| 2009/0074907 A1 | 3/2009 | Gunther |
| 2010/0015275 A1 | 1/2010 | Günther |
| 2010/0227019 A1* | 9/2010 | Kaushal et al. ............... 425/569 |

OTHER PUBLICATIONS

R.E. Juarez et al, Synthesis of nanocrystalline zirconia powders for TZP ceramics by a nitrate-citrate combustion route, Feb. 2000, Journal of the Europoen Ceramic Society, pp. 133-138 (PDF copy).*

* cited by examiner

INJECTION NOZZLE WITH MULTI-PIECE TIP PORTION

CROSS-REFERENCE TO RELATED APPLICATIONS

This application claims the benefit of U.S. Patent Application No. 61/804,602, filed Mar. 22, 2013, the contents of which are incorporated herein by reference in their entirety

FIELD OF THE INVENTION

The present disclosure relates to an injection molding apparatus and more particularly to hot runner injection nozzles made of several cooperating parts.

BACKGROUND OF THE INVENTION

Hot runner injection nozzles are known. These nozzles are made of several parts designed to meet injection molding operating conditions for various materials and for various applications. These parts are made of various materials that need to be manufactured with high accuracy, low tolerances and also configured to be machine-able with available manufacturing equipment. These hot runner nozzles and the associated parts need to be designed and made to be easy to assemble and service in the field.

An area at the end of the nozzle is the nozzle tip area, which is proximate to the mold gate. In this area the injection pressure is very high. Nozzle tips are known and they are in many cases attached to the body of the nozzle in the nozzle tip area.

The nozzle tips sometimes have to be made of materials having conflicting properties or characteristics. If they are made of highly conductive materials, these materials are in many cases not very wear resistant. Many of the materials that can be used for the nozzle tips used in hot runner nozzles and that have good wear resistance have low thermal conductivity.

In many hot runner nozzle applications there is a need to use nozzle tip connectors, nozzle tip seals and nozzle tip insulators that have to cooperate with the nozzle tips and operate and perform together as a unit.

Because the nozzle tips and the tip seals are made of different materials and because they have a different thermal conductivity and a different coefficient of thermal expansion at the injection molding processing temperatures, there is always a concern with the known tips and seals regarding two types of leakage caused by the injection pressure of a molten material into a mold cavity through the nozzle tips. A first leakage, that sometimes is harder to contain, can appear between an outer surface of the tip and an inner surface of the tip seal. A second more common leakage can appear between an outer surface of the tip seal and a wall of a mold component adjacent the mold gate contacting the outer surface of the tip seal. Other leakage paths can further appear between other cooperating surfaces of the nozzle tip and tip seal that have small gaps caused by manufacturing errors or thermal expansion.

There is a need to design and manufacture hot runner nozzles and hot runner nozzle tips that have improved features and good thermal and wear resistance properties.

There is a need to design and manufacture nozzle tips, nozzle tip connectors, nozzle tip seals and nozzle tip insulators that have improved features and characteristics to better cooperate with the nozzle tips and better operate and better perform together as a unit.

There is a need to design and manufacture nozzle tips, nozzle tip connectors, nozzle tip seals and nozzle tip insulators where the first leakage and the second leakage are contained for long hours of operation of the hot runner nozzle.

SUMMARY OF THE INVENTION

This invention discloses designs and materials to manufacture hot runner nozzles and hot runner nozzle tips with improved operation characteristics. These nozzle tips cooperate with improved nozzle tip connectors, improved nozzle tip seals and improved nozzle tip insulators.

In one embodiment of the invention, the nozzle tip is shaped or is made by sintering metal matrix composite (MMC) materials. In one embodiment of the invention, the metal matrix composite (MMC) material for the tip is a cemented carbide. In one embodiment of the invention, the cemented carbide material for the tip is Tungsten Carbide (e.g. a carbide that includes tungsten in a proportion exceeding 50%). In one embodiment of the invention the cemented carbide material for the tip is Titanium-Carbide. As a result of the use of the metal matrix composite (MMC) material, the nozzle tip has a first coefficient of thermal expansion at an operating temperature provided by a nozzle heater between about 100 degrees C. and about 400 degrees C.

In another embodiment of the invention the nozzle tip is coated to increase the lifetime, especially the wear resistance, of the nozzle tip. In some embodiments the coating for the nozzle tip is selected for each application. The coatings are selected from one of these materials: TiN (titanium nitride), TiC (titanium carbide), Ti(C)N (titanium carbide-nitride), and TiAlN (titanium aluminum nitride). In other embodiments the coating is made with DLC (Diamond-like carbon).

In some of the embodiments the coatings are deposited via thermal CVD (Chemical Vapour Deposition) and, for certain applications, with the mechanical PVD (Physical Vapour Deposition) method.

In one embodiment of the invention a nozzle tip seal surrounding the nozzle tip and having an inner surface and an outer surface is shaped or made from a ceramic based powder material, the tip seal having a second coefficient of thermal expansion that is different from (e.g. less than) the first coefficient of thermal expansion at an operating temperature provide by the heater between about 100 degrees C. and about 400 degrees C.

In one embodiment of the invention a connecting element contacting the nozzle tip and the nozzle tip seal is positioned to removably couple the tip seal to the nozzle tip. This connecting element is also positioned to create a first contact seal (which may be annular) between the nozzle tip and the tip seal. The connecting element may also create a second contact seal between the tip seal and a mold component. In another embodiment of the invention the connecting element is positioned to create third annular contact seal between the nozzle tip and the tip seal. The nozzle tip being adjacent to a mold cavity gate in the mold component.

In operation this hot runner nozzle assembly provides an improved heat profile, reduced wear of the tip, and reduced leakage at the tip area under a wider operating processing window.

BRIEF DESCRIPTION OF THE DRAWINGS

Non-limiting embodiments may be more fully appreciated by reference to the following detailed description when taken in conjunction with the accompanying drawings, in which.

DETAILED DESCRIPTION OF THE INVENTION

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Figure 1:
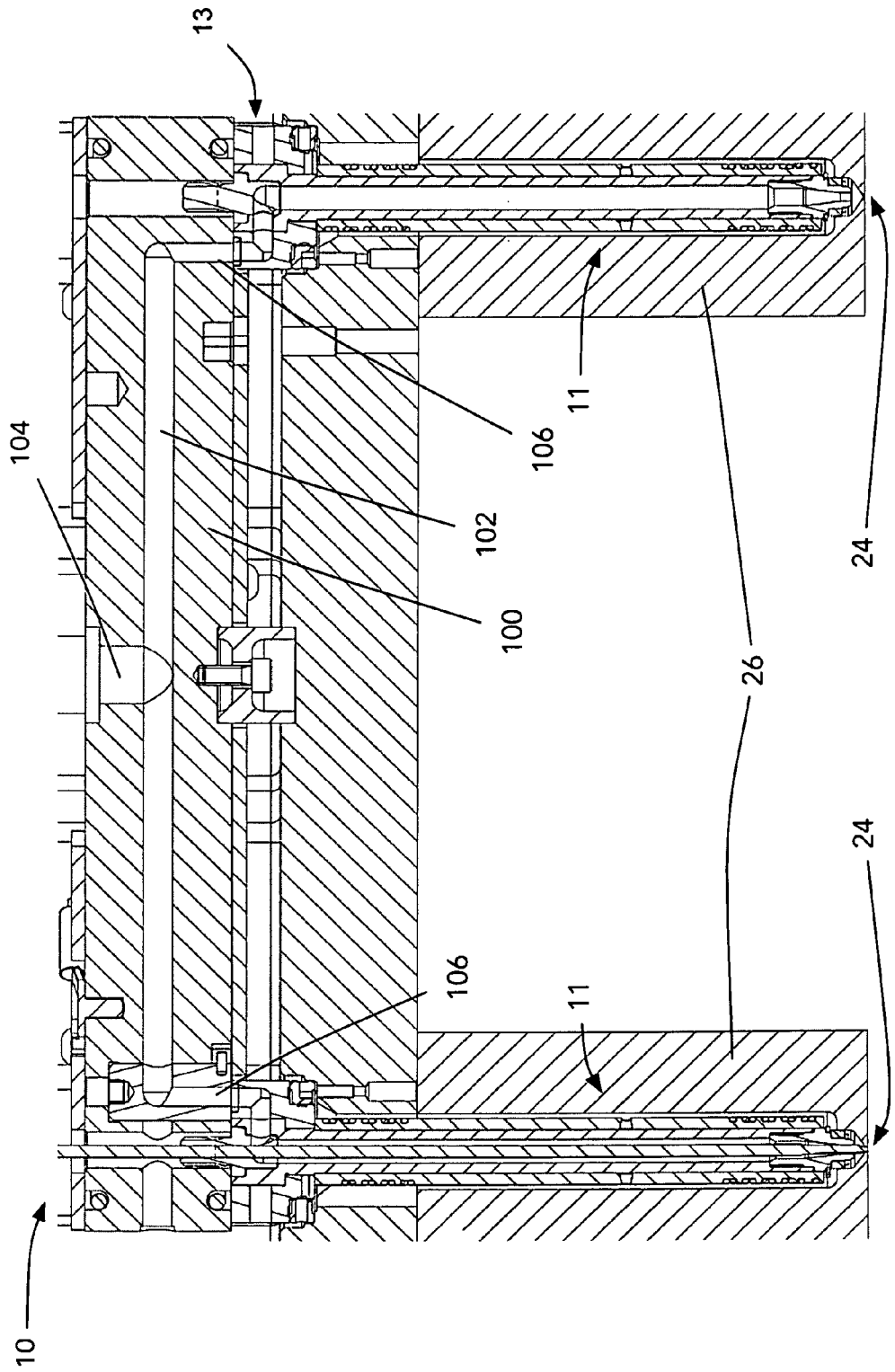
FIG. 1 is a sectional side view of a portion of an injection molding machine that includes a plurality of hot runner injection nozzles in accordance with an embodiment of the present invention.

Reference is made to FIG. 1, which shows a portion of an injection molding machine 10. The injection molding machine 10 includes, among other things, a hot runner manifold 100 with a plurality of melt channel network 102 having an inlet 104 and a plurality of outlets 106. The machine 10 further including a plurality of injection nozzles 11 each of which receive melt from one of the outlets 106 and transport the melt to a gate 24 of a mold cavity 25 (see FIG. 1a) of a mold component 26. Only a portion of the mold component 26 is shown, however it will be understood that the mold component 26 includes a plurality of elements that mate together to define a plurality of mold cavities 25.

Figure 1A:
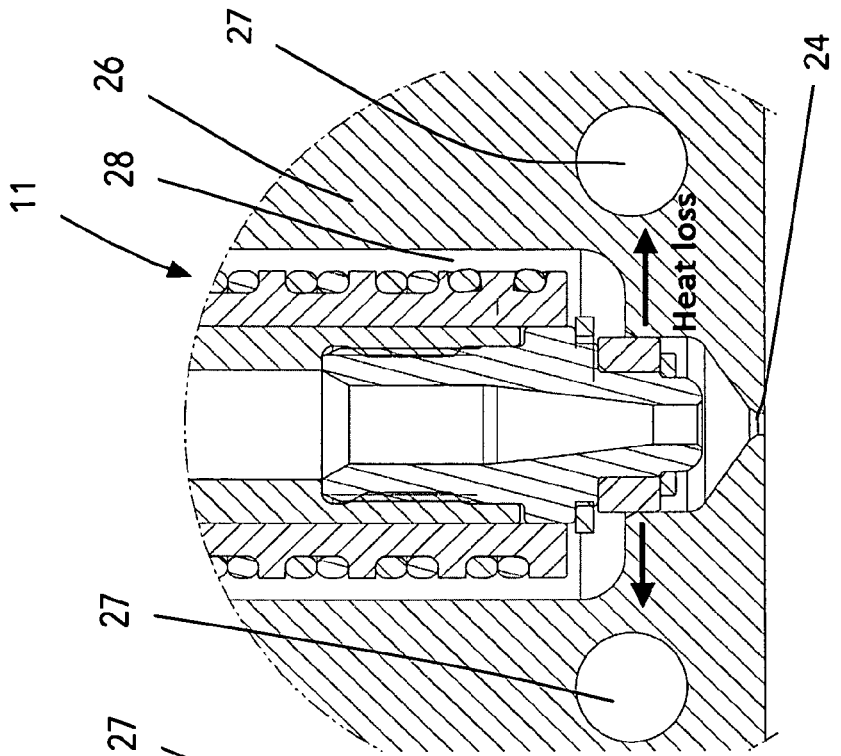
FIG. 1a is a magnified view of a portion of the injection molding machine shown in FIG. 1, showing a mold cavity.
Figure 1B:
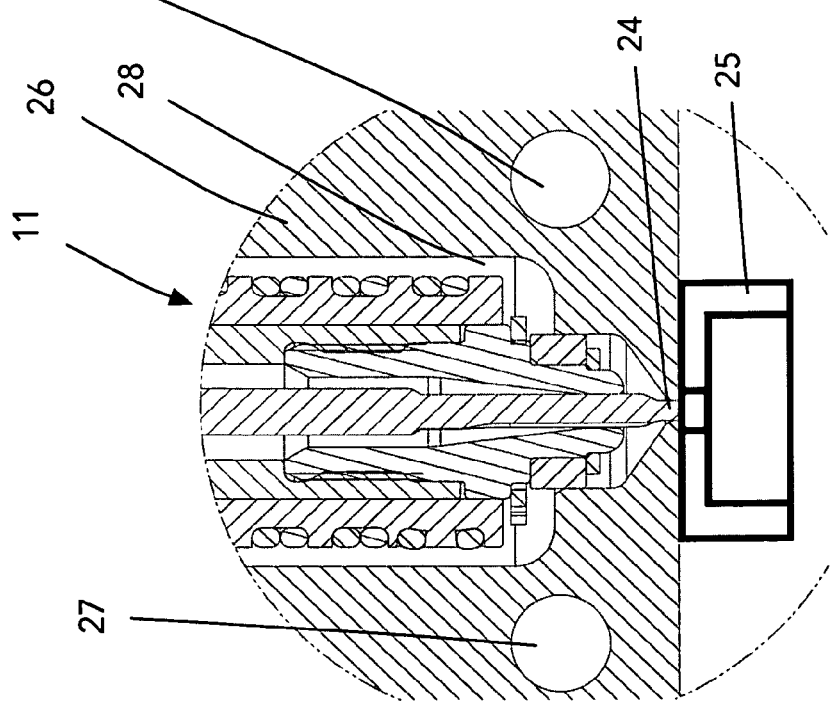
FIG. 1b is a magnified view of a portion of the injection molding machine shown in FIG. 1, illustrating heat loss from a nozzle to a mold component proximate the mold cavity.

The melt that is transported through the hot runner manifold 100 and through the nozzles 11 is heated so as to improve its flow characteristics. Referring to FIG. 1a, each mold cavity 25 receives melt from a nozzle 11 and cools the melt to solidify it and thereby form a molded product. Cooling channels shown at 27 are provided in the mold component 26 near the mold cavities 25 to transport coolant for the purpose of cooling the melt. Referring to FIG. 1b, the nozzle 11 is located in a space 28 in the mold component 26 and contacts the mold component 26 via a tip seal 18 to seal off the area immediately around the gate 24 in order to contain the melt. Because it is desired to keep the melt hot in the nozzle 11 and to cool the melt in the mold component 26, there is a temperature difference between the nozzle 11 and the mold component that results in some heat loss from the nozzle 11 into the mold component 26. It is desirable to reduce this heat loss as it is detrimental to both the flow of melt leaving the nozzle 11 and to the cooling of the melt in the mold cavities 25.

Figure 2:
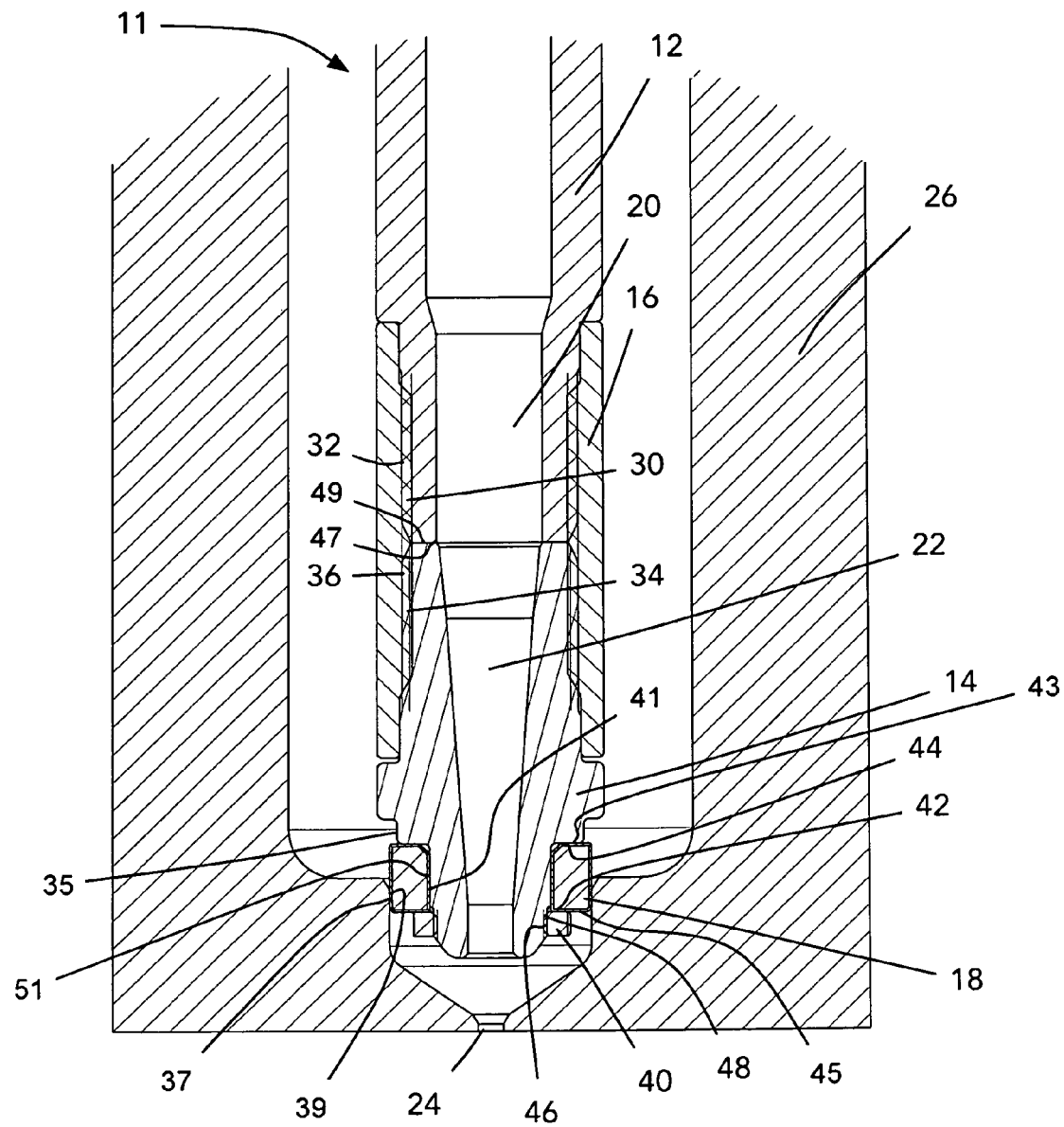
FIG. 2 is a sectional side view of one of the hot runner injection nozzles shown in FIG. 1.

Reference is made to FIG. 2, which shows a magnified view of a portion of one of the injection nozzles 11. The injection nozzle 11 includes a nozzle body 12, which itself includes a nozzle head portion 13, a nozzle tip 14, a tip retainer 16 and the aforementioned tip seal 18.

The nozzle body 12 has a melt channel 20 therethrough that is positioned to transport melt from one of the hot runner manifold outlets 106 (FIG. 1) to the nozzle tip 14. The nozzle tip 14 has a melt channel 22 therethrough that is positioned downstream from the melt channel 20 so as to transport the melt to the gate 24 for one of the mold cavities 25 in a mold component 26. The nozzle tip 14 is preferably made from a suitably hard material and has a first, (preferably high), thermal conductivity and a first coefficient of thermal expansion in the operating temperature window (i.e. temperature range) of about 100 degrees C. to about 400 degrees C. The first coefficient of thermal expansion may be in the range of 4.00-6.00 ($\times 10^{-6}$ K$^{-1}$) at 20-1000 C. An example of a material for the nozzle tip 14 is a sintered metal matrix composite (MMC) powder, such as tungsten carbide in order to resist wear during use from contact with the melt, particularly when the melt is a resin that contains a glass filler or other hard fillers. In some embodiments, such as the embodiments shown in FIGS. 4, 5 and 6, a tungsten carbide tip is also useful in order to resist wear from friction during movement of a valve pin, as discussed further below.

Referring to FIG. 2, the tip retainer 16 is removably coupled to the nozzle body 12 and has the tip 14 connected thereto, so that the tip 14 is effectively removable from the nozzle body 12 for service. For example, the tip retainer 16 may have an inner threaded portion 30 and may be coupled by the inner threaded portion 30 to an outer threaded portion 32 on the nozzle body 12.

The tip 14 may be coupled to the tip retainer 16 by any suitable means. For example, the tip retainer 16 may have a second inner threaded portion 34 and the tip 14 may have an outer surface 35 on which there is an outer threaded portion 36, through which the tip 14 is coupled to the tip retainer 16. This structure eliminates the need to provide an inner threaded portion on the tip 14, which can be relatively difficult to manufacture particularly in embodiments wherein the tip 14 is made from tungsten carbide. The inner threaded portion 30 (which may, for convenience be referred to sometimes as the first inner threaded portion 30) and the second inner threaded portion 34 may be separate, distinct portions of the tip retainer 16, or alternatively they may join to form a continuous threaded portion as shown in FIG. 2.

Figure 2A:
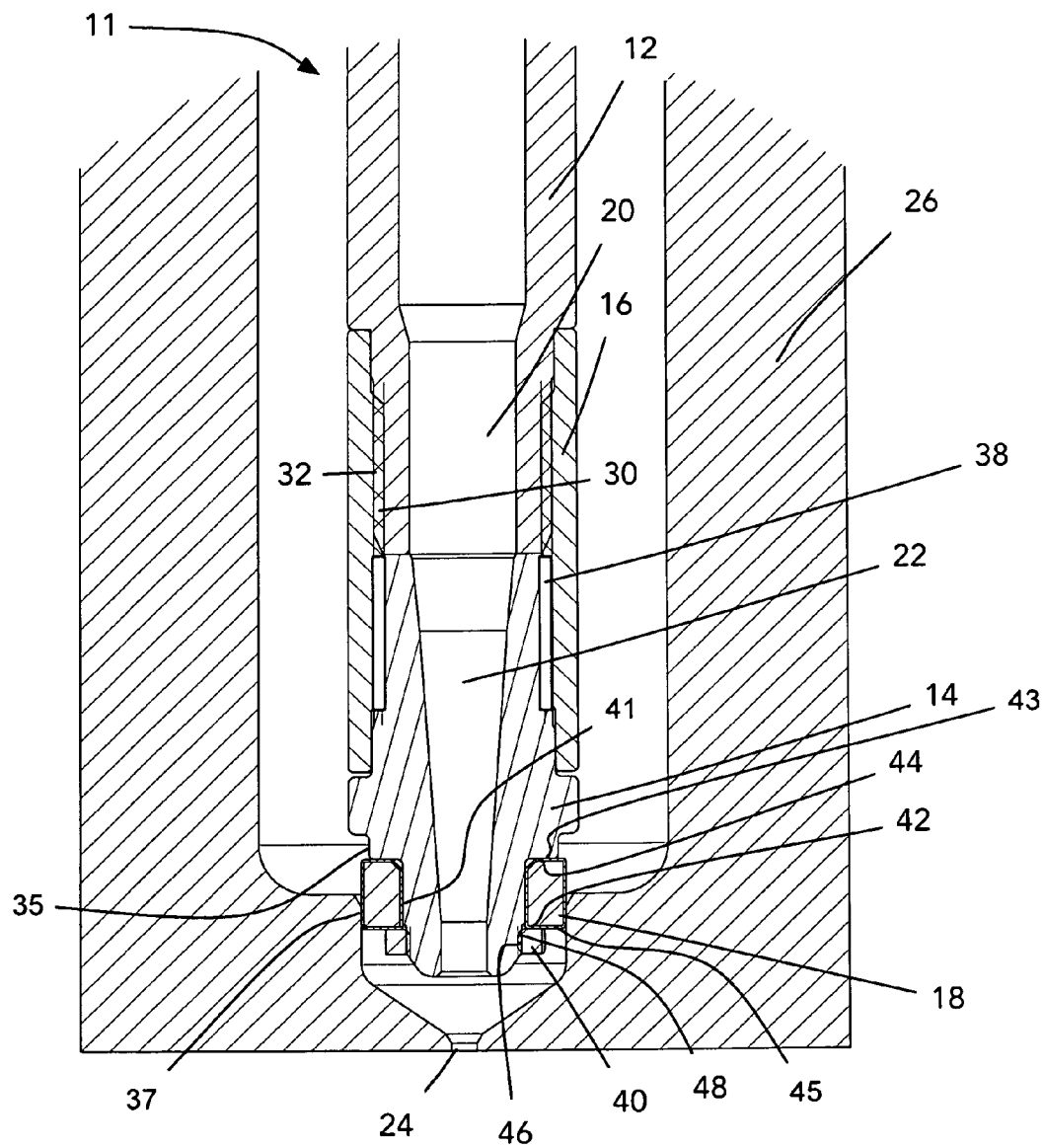
FIG. 2a is a sectional side elevation view of a variant of the hot runner injection nozzle shown in FIG. 1 whereby a tip is connected to a tip retainer by a brazed connection.

In another embodiment shown in FIG. 2a, the tip 14 may be brazed to the tip retainer 16. In FIG. 1a, the brazed joint a shown at 38. Brazing the tip 14 to the tip retainer 16 provides several advantages. One advantage is that it eliminates the need to provide the outer threaded portion 36 on the tip 14, which can be difficult when the tip 14 is made from a material such as tungsten carbide. In yet another embodiment, the tip 14 may be connected to the tip retainer 16 by a press-fit connection.

The tip 14 may be sealingly engaged with the nozzle body 12 via engagement of tip engagement surface 47 on the nozzle body 12 with a body engagement surface 49 on the tip 14, so as to permit melt to flow from the nozzle body 12 into the tip 14 without leaking out of the nozzle 11.

The tip seal 18 is positioned around the tip 14 and has an outer surface 37 is positioned to engage a sealing surface 39 on the mold component 26 to form a seal therewith so as to inhibit the flow of melt therepast. The tip seal 18 may be made from a material that has a second thermal conductivity that is preferably lower than that of the tip 14 so as to inhibit heat transfer from the tip 14 into the mold component 26. The tip seal 18 also has a second coefficient of thermal expansion in the operating temperature window of about 100 degrees C. to about 400 degrees C. The second coefficient of thermal expansion may be lower than that of the tip 14. The tip seal 18 is preferably made from an insulative material. An example of a suitable insulative material is a sintered ceramic based powder material. The tip seal 18 further includes a radially inner surface 41 that faces a portion of the outer surface 35 of the tip 14. The tip seal 18 further includes a first annular surface 43 and a second annular surface 45.

It will be noted that it can be difficult to directly join a ceramic component to a component made from a metal matrix composite such as tungsten carbide. To overcome this difficulty, a seal retainer 40 (which may also be referred to as a seal and connector element 40) may be used to retain the tip seal 18 on the tip 14. The seal retainer 40 is a unitary component which contacts both the tip 14 and the tip seal 18. The seal retainer 40 removably connects to the tip 14 by any suitable means, so that the seal 18 is held between a retainer surface 42 on the seal retainer 40 and a retaining surface 44 on the tip 14, such that first annular surface 43 on the tip seal 18 faces retaining surface 44 and second annular surface 45 on the tip seal 18 faces retainer surface 42. The seal retainer 40 may connect to the tip 14 by an inner threaded portion 46 on the seal retainer 40 that engages an outer threaded seal retainer engagement portion 48 on the tip 14. In other words the seal retainer 40 may be threaded onto the tip 14 and removably couples the tip seal 18 to the tip 14.

Optionally, the seal retainer 40 may be welded to the tip 14, however, in preferred embodiments it is not welded. In yet another alternative, the seal and/or the seal retainer 40 may be connected to the tip 14 by an adhesive such as a suitable type of Loctite (provided by Henkel Corporation of Rocky Hill, Conn., USA). In yet another alternative, the seal retainer 40 may be shrink fit (i.e. an interference fit formed by mounting the seal retainer 40 the tip 14 when either the seal retainer 40 is heated to temporarily expand its inner diameter and/or the tip 14 is cooled to temporarily reduce its outer diameter, and then to return them to a temperature where the inner diameter of the seal retainer 40 is smaller than the outer diameter of the tip 14).

It has been found that, due to the materials used for one or both of the tip 14 and the tip seal 18 it can be difficult to manufacture the tip 14 and the tip seal 18 to tight tolerances. This can be because the manufacturing processes used for both are inherently difficult to provide tight tolerances. This can also be because of the different coefficients of thermal expansion between the tip 14 and the tip seal 18. As a result, it has been found that there can be a leakage path between the tip 14 and the tip seal 18. There can also be a leakage path between the tip seal 18 and the mold component 26, however, it has been found that this is relatively easier to address and to arrive at a suitable seal between the outer surface 37 of the tip seal 18 and the sealing surface 39 of the mold component 26.

The seal retainer 40 controls a first seal between the tip seal 18 and the tip 14, which is the seal formed between annular surface 43 on the tip seal 18 and the associated annular surface 44 on the tip 14. This seal may be referred to as a first "tip seal-nozzle tip" seal. The seal retainer 40 may control this first tip seal-nozzle tip seal by, for example, controlling the force with which the surface 43 on the tip seal 18 engages the surface 44 on the tip 14 (i.e. driving the annular surface 43 into engagement with the annular surface 44 with a selected force). If a sufficient force is not used, there will not be an effective seal between the tip 14 and the tip seal 18. Where the term 'seal' is used in the context of this patent application, it is intended to mean that substantially no leakage occurs therepast during normal operation of the associated components. Thus, simple contact between the surfaces 43 and 44 may not provide a seal. Thus it can be seen that the seal retainer 40 may do more than just hold the tip seal 18 on the tip 14. By controlling the first seal between the nozzle tip 14 and the tip seal 18 (in particular by controlling the seal between annular surfaces 43 and 44) the seal retainer 40 compensates to some extent for the difference in thermal expansion in operation between the tip 14 and the seal 18 and more broadly compensates for the poor seal that may be provided between radially inner and outer surfaces 41 and 51 and between surfaces 43 and 44, which results from manufacturing tolerances and differences in amounts of thermal expansion.

The seal between surfaces 41 and 51 may be referred to as a second "tip seal-nozzle tip" seal between the tip seal 18 and the nozzle tip 14. The seal retainer 40 may also control the second "tip seal-nozzle tip" seal in one or more of several ways. For example, a seal may be formed between surfaces 42 and 45 thereby preventing leakage of melt therepast. A seal may be formed between the inner surface 46 of the seal retainer 40 and the corresponding outer surface 48 (which his part of outer surface 35) on the tip 14.

Figure 3:
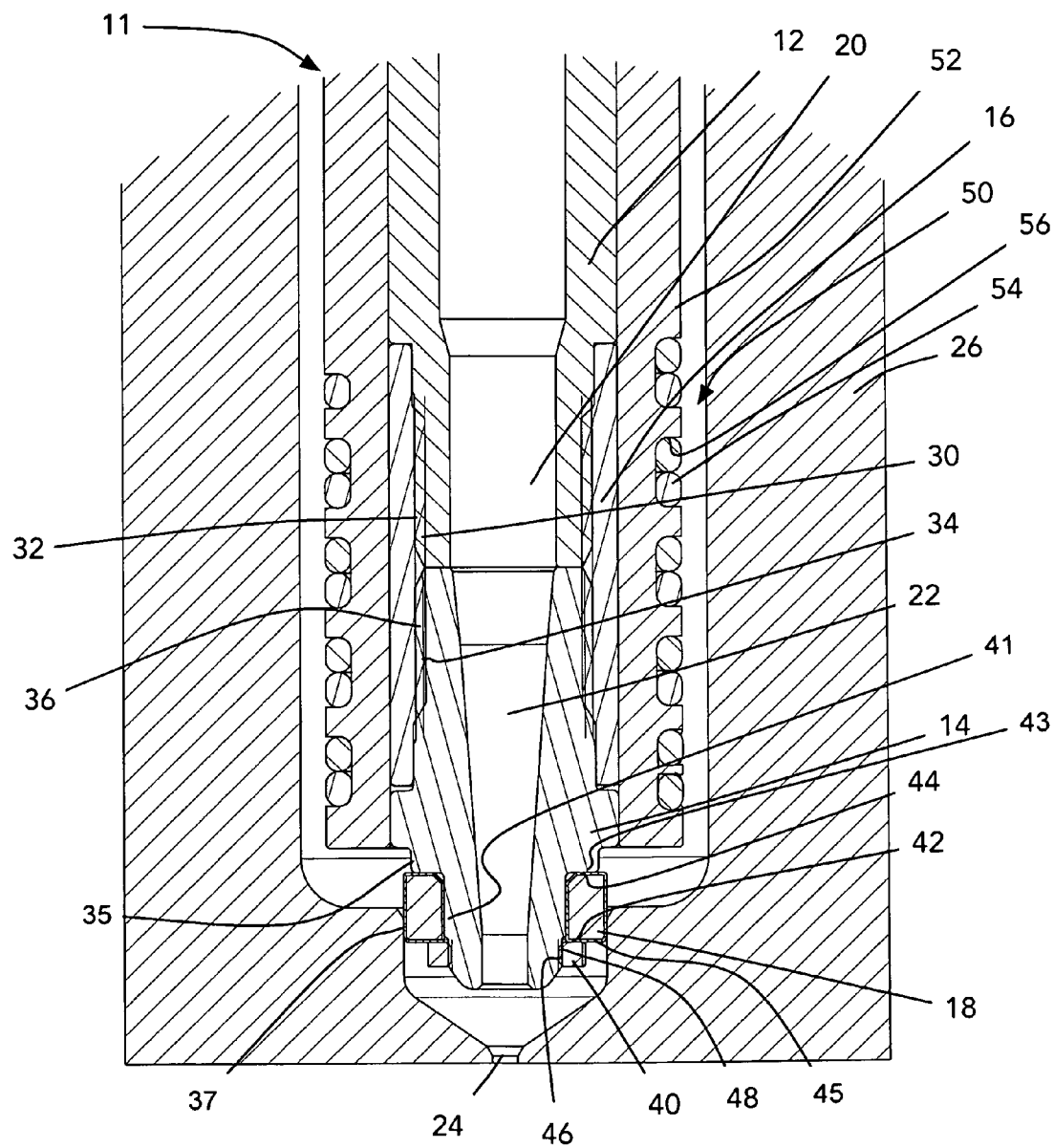
FIG. 3 is a sectional side view of the hot runner injection nozzle shown in FIG. 2, with an optional nozzle heater.

Referring to FIG. 3, the nozzle 11 may further include a nozzle heater 50 that may include a heater body 52 and an electric heating element 54 that is positioned in a groove 56 in the heater body 52. The nozzle heater 50 is engaged with the nozzle body 12 and is configured for heating melt in the nozzle 11. The nozzle heater 50 provides an operating temperature window for the nozzle 11 of between about 100 degrees C. and about 400 degrees C.

Figure 4:
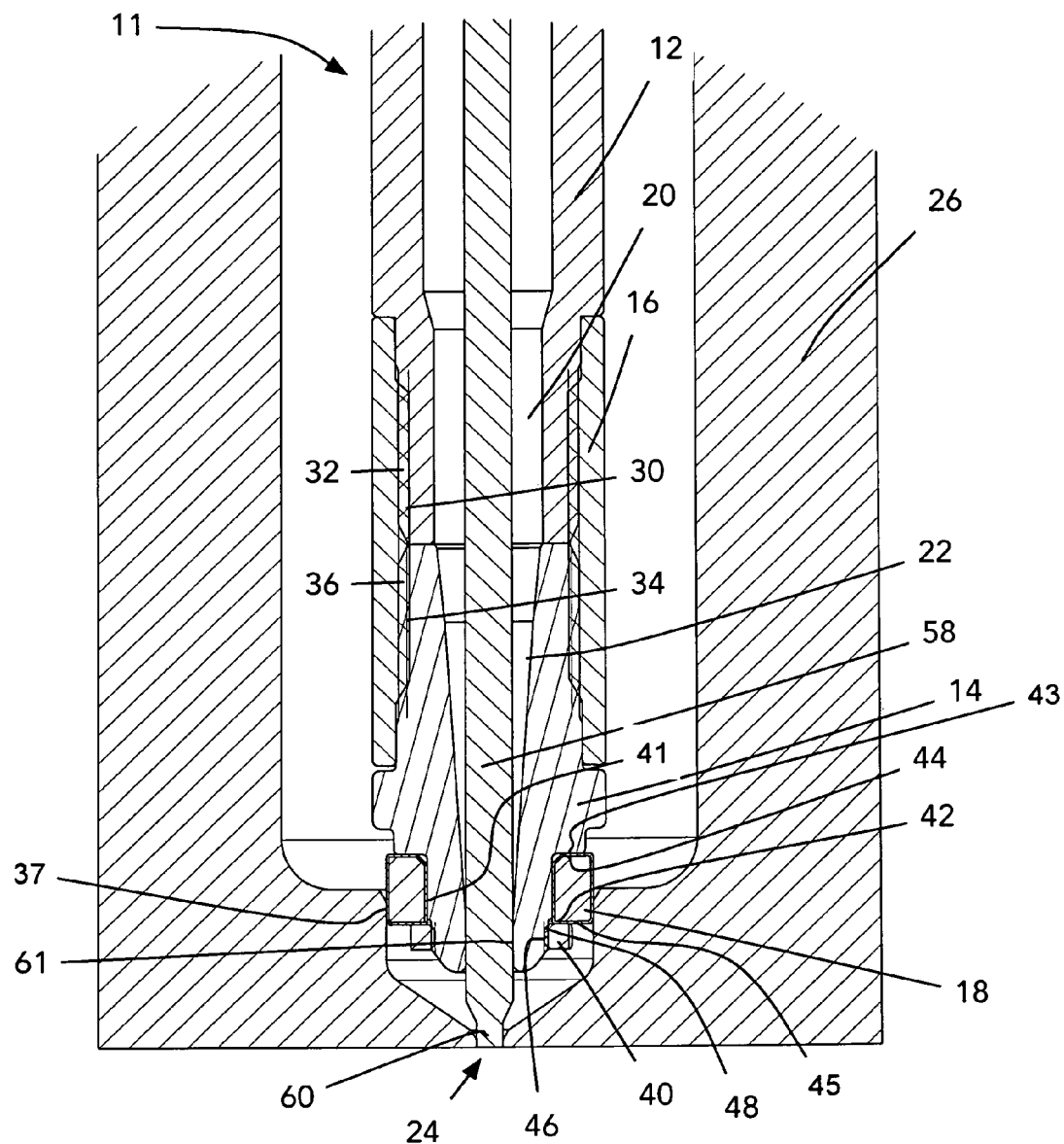
FIG. 4 is a sectional side view of the hot runner injection nozzle shown in FIG. 2, with an optional valve pin.

Referring to FIG. 4, the nozzle 11 may further include a valve pin 58, that is movable between a closed position (shown in FIG. 3) in which the valve pin 58 prevents the flow of melt through the gate 24, and an open position to permit the flow of melt through the gate 24. A tip portion 60 of the valve pin 58 is aligned with the gate 24 by a wall 61 of the nozzle tip 14. Thus there may be frictional contact between the valve pin 58 and the nozzle tip 14 during movement of the valve pin 14. Making the nozzle tip 14 from a hard material such as tungsten carbide reduces the amount of wear that results from such frictional contact.

Figure 5:
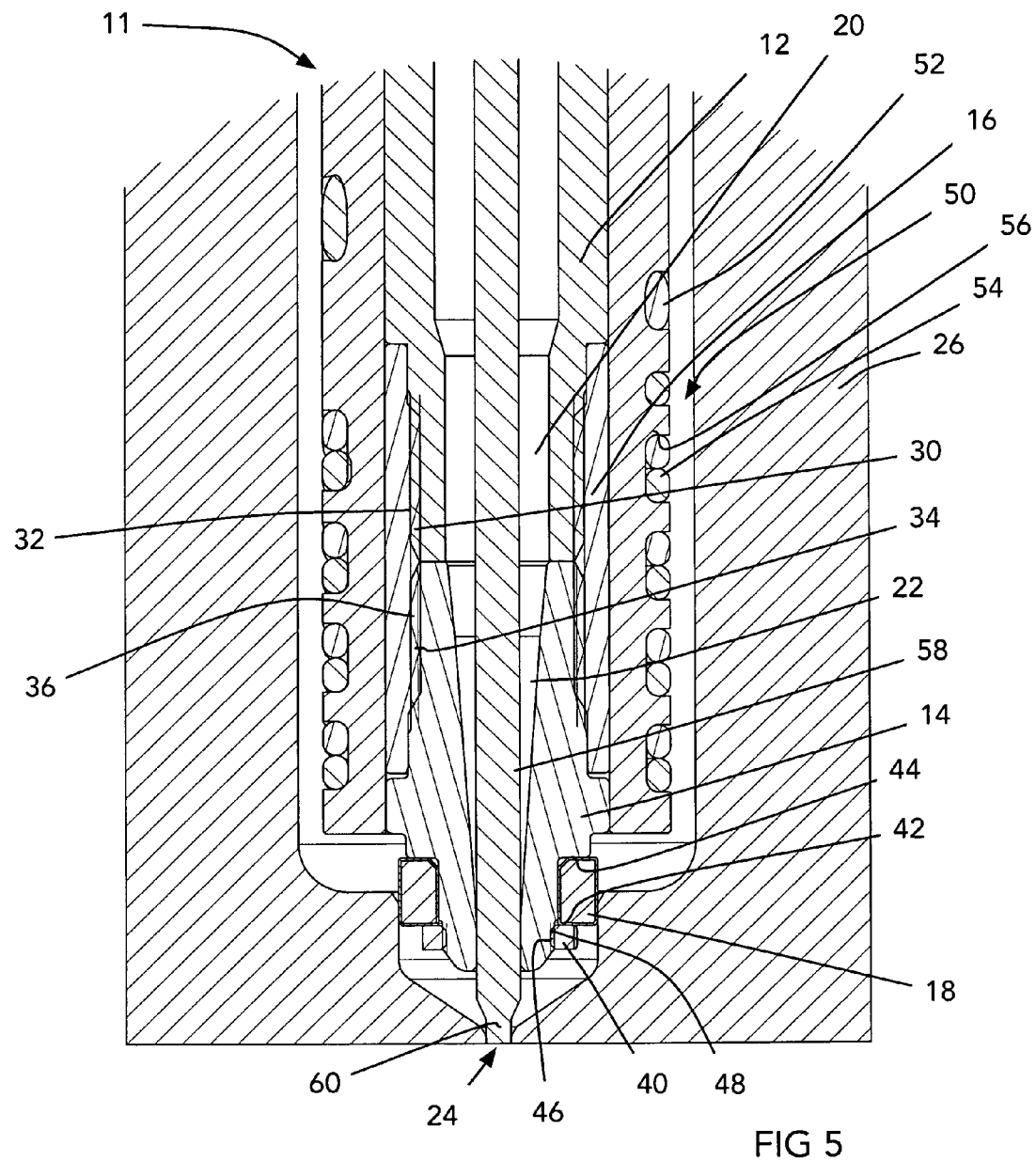
FIG. 5 is a sectional side view of the hot runner injection nozzle shown in FIG. 2, with an optional nozzle heater and valve pin.

Referring to FIG. 5, the nozzle 11 may further include both the valve pin 58 and the nozzle heater 50.

Figure 6:
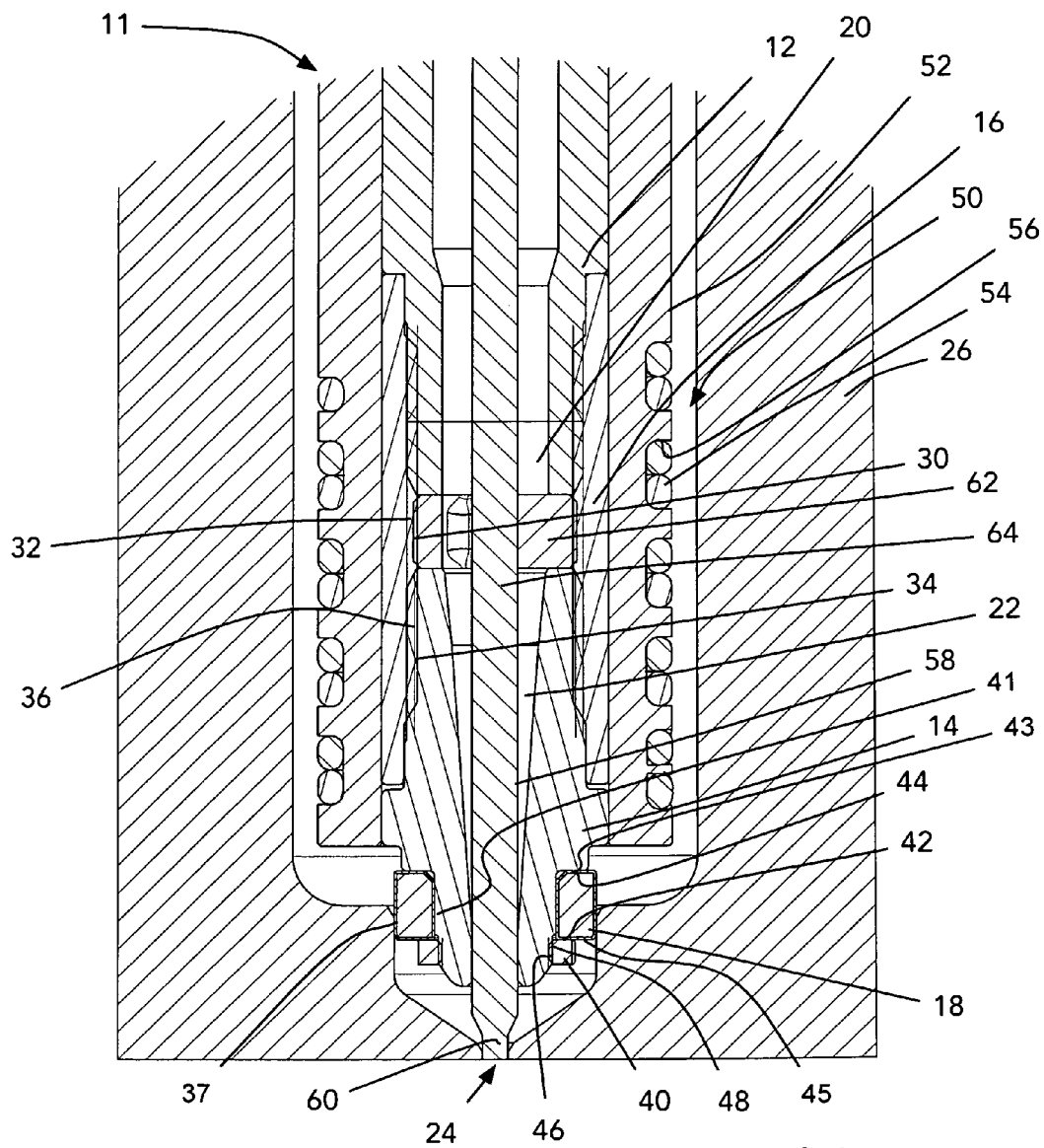
FIG. 6 is a sectional side view of the hot runner injection nozzle shown in FIG. 2, with an optional nozzle heater and valve pin, and a valve pin alignment member.

Referring to FIG. 6, the nozzle 11 is shown including both the valve pin 58 and the nozzle heater 50, and also a valve pin alignment member 62 that is positioned between the nozzle tip 14 and the nozzle body 12 (and that is held in place by the tip retainer 16). The valve pin alignment member 62 is configured for aligning a portion 64 of the valve pin 58 upstream from the tip portion 60 of the valve pin.

Figure 7:
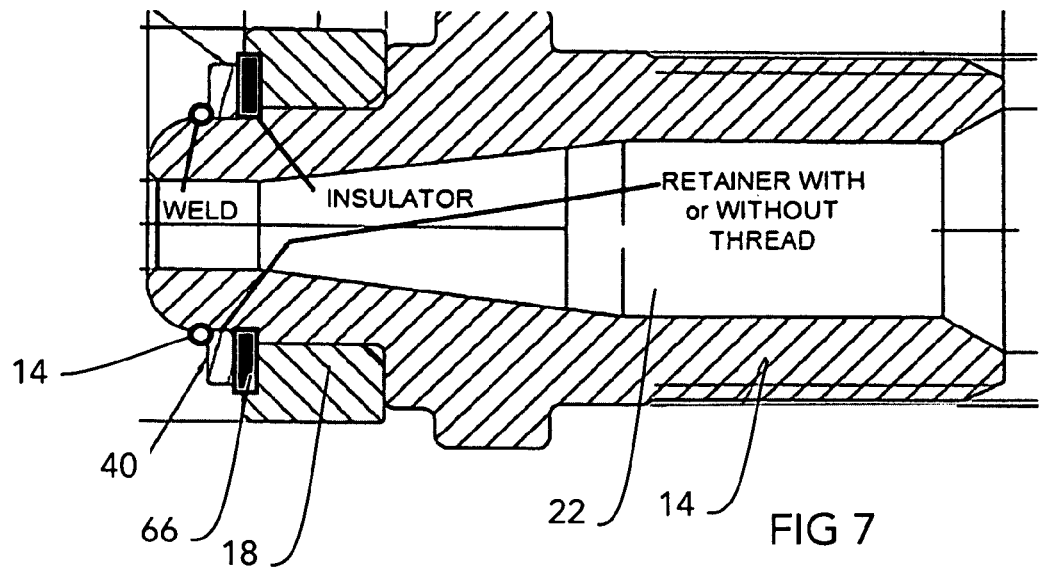
FIGS. 7-15b are sectional side views of portions of additional embodiments of the hot runner injection nozzle shown in FIG. 2.

Referring to FIG. 7, the tip seal 18 may be retained on the nozzle tip 14 by a seal retainer 40 (which may be made from steel for example), however, an insulator member 66 may be provided between the seal retainer 40 and the tip seal 18 so as to inhibit heat transfer from the seal retainer 40 into the tip seal 18. The seal retainer 40 is shown in FIG. 7 as being welded to the nozzle tip 14, wherein the weld is represented by a circle 68. It will be noted that the circular shape identified at 68 is provided only to identify that a weld is there. The weld 68 need not be circular in cross-section and may have any suitable shape, such as a fillet weld. It will be further noted that the weld is entirely optional may be omitted and the seal retainer 40 may be connected to the nozzle tip 14 any other suitable way.

Figure 8:
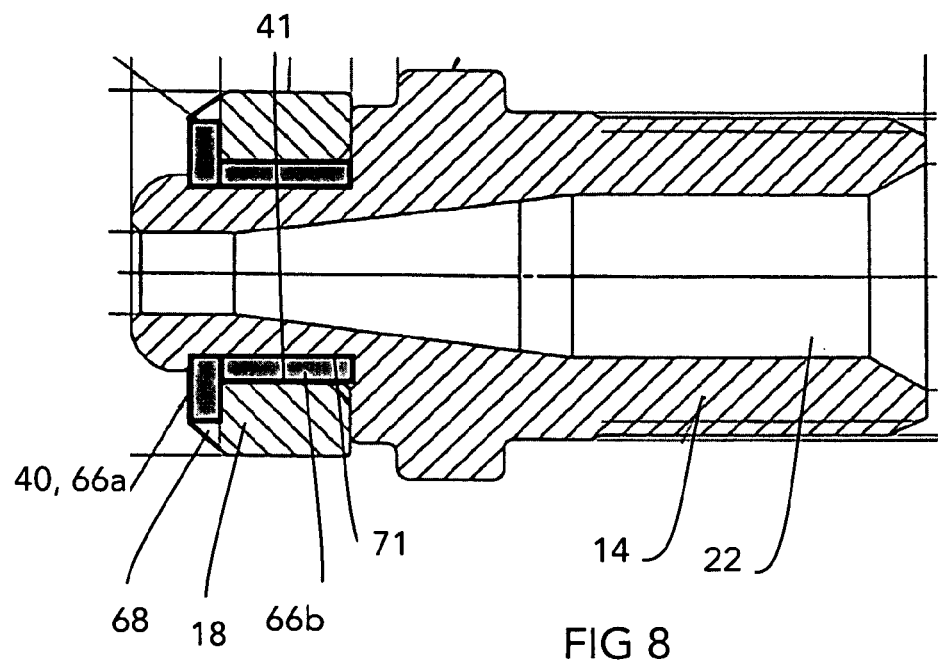

Referring to FIG. 8, the tip seal 18 is retained on the nozzle tip 14 by a seal retainer 40 that is itself also an insulator member 66a so as to inhibit heat transfer from the nozzle tip 14 to the tip seal 18 through the seal retainer 40. Additionally, a second insulator member 66b is provided between the inner diameter surface (shown at 70) of the tip seal 18 and the nozzle tip 14 so as to reduce heat transfer from the nozzle tip 14 into the tip seal 18 (and ultimately into the mold component 26 (FIG. 1)). The insulator member 66*b* also acts as a seal to prevent leakage of melt therepast where it mates with other elements. In FIG. 8, the first insulator member and seal retainer 40, 66*a* is shown as being welded to the tip seal 18 via weld 68. An optional weld 68 or some other connecting means such as a threaded connection, holds the first insulator member and seal retainer 40, 66*a*, the second insulator member 66*b* and the tip seal 18 in place in a groove shown at 71 in the nozzle tip 14.

Figure 9:
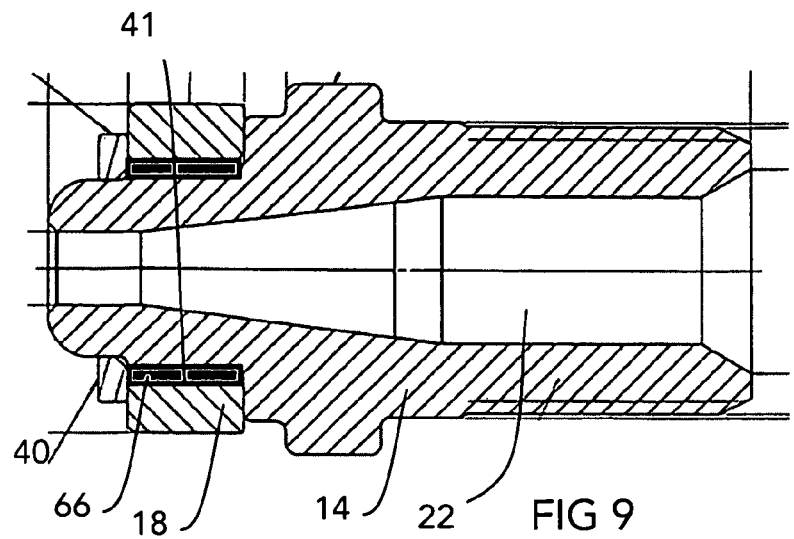

Referring to FIG. 9, the tip seal 18 is retained on the nozzle tip 14 by the seal retainer 40, which may be joined to the nozzle tip in any suitable way. An insulator member 66 is provided between the inner diameter surface 70 of the tip seal 18 and the nozzle tip 14 to inhibit heat transfer from the nozzle tip 14 into the tip seal 18 through surface 70.

Figure 10:
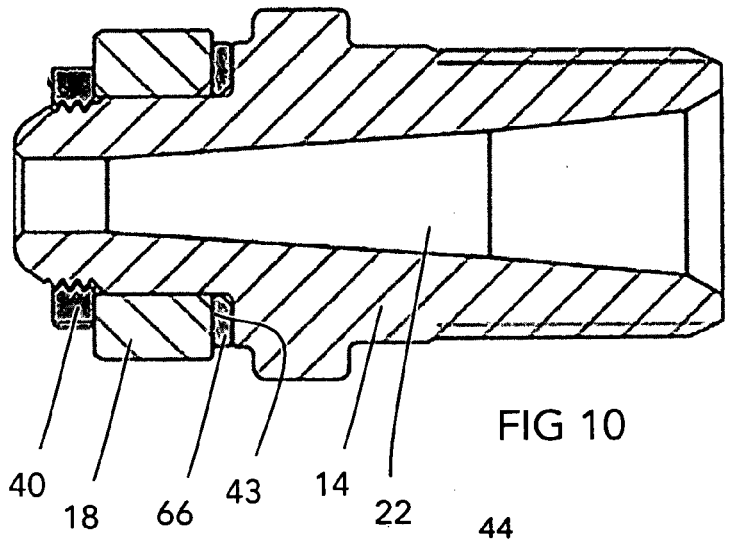

Referring to FIG. 10, an insulator member 66 is provided between axial end face 43 of the tip seal 18 and the nozzle tip 14 so as to reduce heat transfer from the nozzle tip 14 into the tip seal 18 through end face 43. Also shown in FIG. 10, the seal retainer 40 is threaded onto to the nozzle tip 14.

Figure 10A:
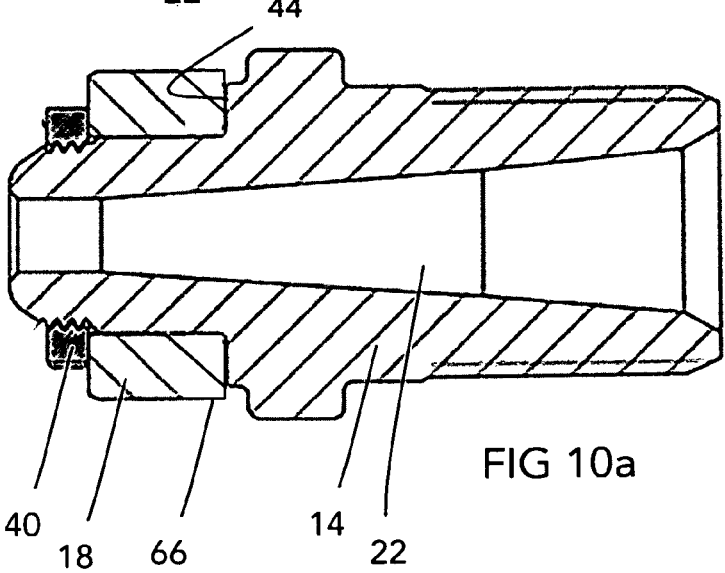

The embodiment in FIG. 10*a* is the same as the embodiment in FIG. 10, except that there is no insulator member 66; instead the tip seal 18 abuts the shoulder 44 on the tip 14.

Figure 11:
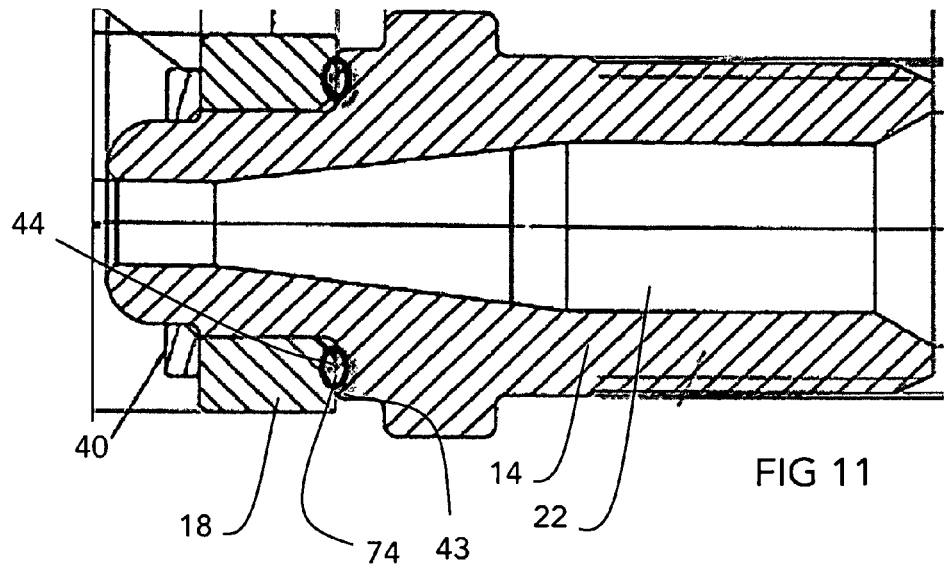

Referring to FIG. 11, an insulator member 74, which may be, for example, an o-ring, is provided between the end face 43 of the tip seal 18 and the retaining surface 44 of the nozzle tip 14. A groove for the o-ring may be provided in one or both surfaces 43 and 44. The insulator member 74 may also act as a seal member that prevents the leakage of melt therepast. In a preferred embodiment the o-ring acts to space the surface 43 from the surface 44, thereby increasing its effectiveness to inhibit heat transfer into the tip seal 18. Even if the two surfaces 43 and 44 contact each other, however, the insulator member 74 preferably still has sufficient resiliency to act as a seal to prevent melt leakage therepast. The seal retainer 40 may be welded to the nozzle tip 14 or connected to the nozzle tip 14 by any other suitable means (e.g. a threaded connection).

Figure 12:
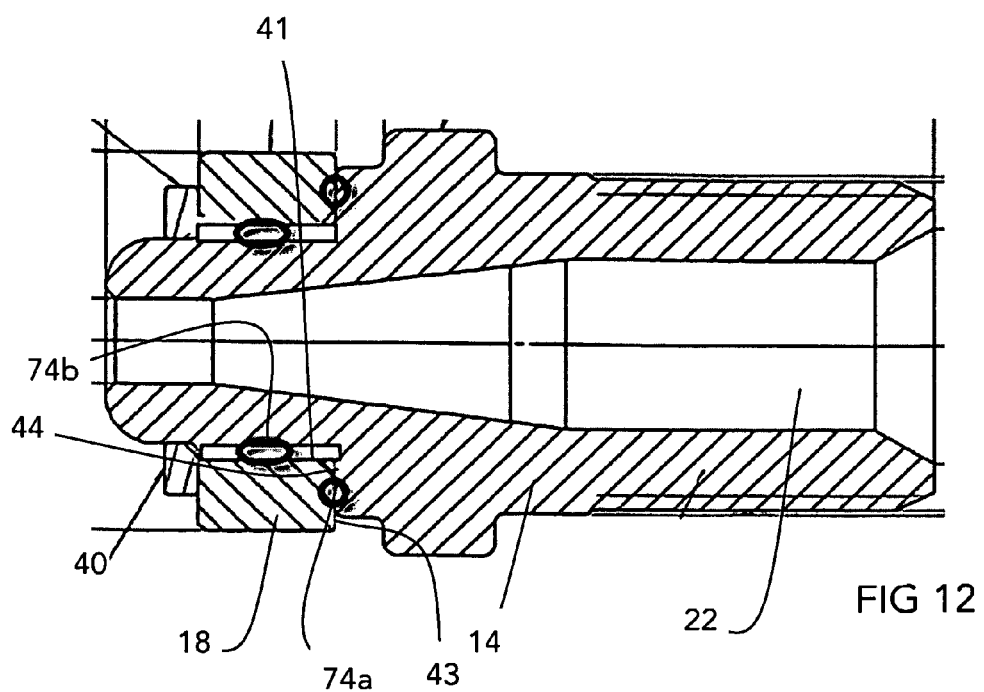

Referring to FIG. 12, a first insulator member 74*a* (which may be, for example, an o-ring) is provided between the end face 43 of the tip seal 18 and the retaining surface 44 of the nozzle tip 14, and a second seal member 74*b* (which may be, for example, an o-ring) is provided between the inner diameter surface 70 of the tip seal 18 and the nozzle tip 14. One or both of the insulator members 74*a* and 74*b* may act as seal members to prevent the leakage of melt therepast. In a preferred embodiment the o-rings act to space the surface 43 from the surface 44 and the inner diameter surface 70 from the corresponding surface on the tip seal 18, thereby increasing their effectiveness to inhibit heat transfer into the tip seal 18. The seal retainer 40 may be welded to the nozzle tip 14 or connected to the nozzle tip 14 by any other suitable means (e.g. a threaded connection). It is possible to have an embodiment wherein only member 74*b* is provided and not insulator member 74*a*.

Figure 13:
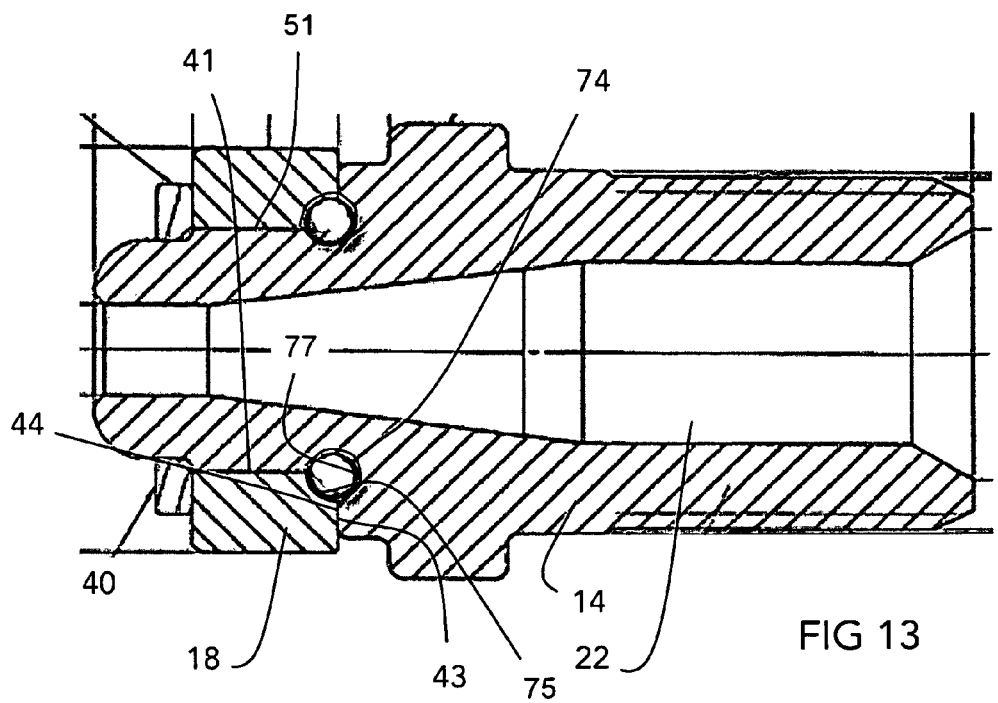

Referring to FIG. 13, an insulator member 74 which may be an o-ring is provided in a corner groove 75 between surfaces 43 and 41, and a corner groove 77 between surfaces 51 and 44 on the nozzle tip 14. Generally speaking, melt may infiltrate between the nozzle tip 14 and the tip seal 18 until it is stopped by whatever seals exist between the two surfaces. The melt itself can act as a seal and furthermore can act as an insulator.

Figure 14:
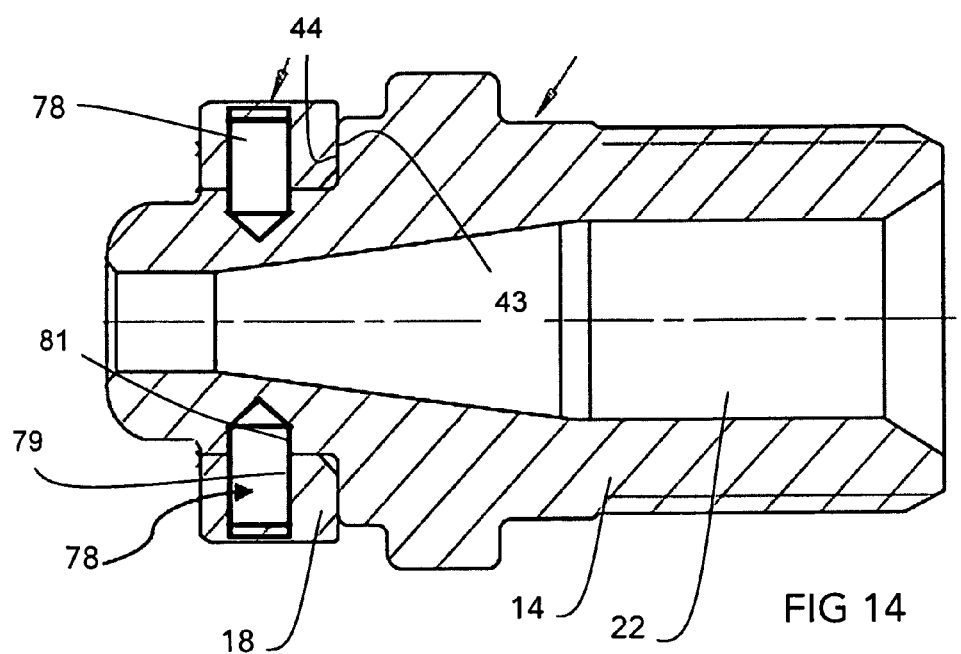

Referring to FIG. 14, the tip seal 18 may be connected to the nozzle tip 14 via one or more set screws 78 or dowels 78. The set screws or dowels 78 may be considered to the seal retainers and may act to provide the surfaces 43 and 44 by virtue of driving the tip seal axially into surface 44 when they are in place in both the apertures shown at 79 and 81 in the tip seal 18 and the tip 14 respectively. The set screws or dowels 78 may also seal against the tip and tip seal to prevent melt leakage out through the apertures 79. Alternatively they may not seal the apertures 79, however the seals formed between the outer surface of the tip seal 18 and the mold component 26 and between the surfaces 43 and 44 will prevent melt leakage outwards.

Figure 15A:
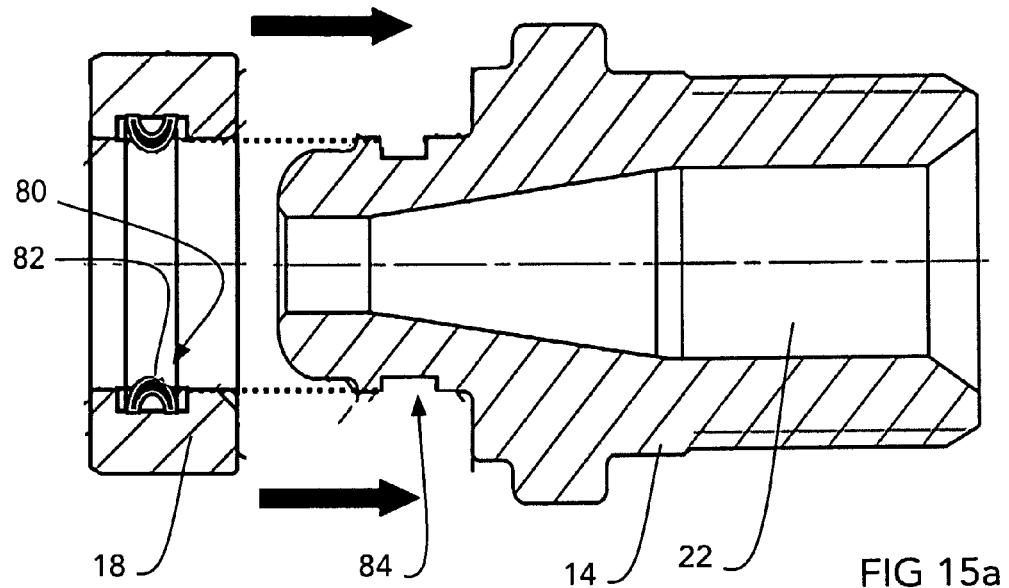
Figure 15B:
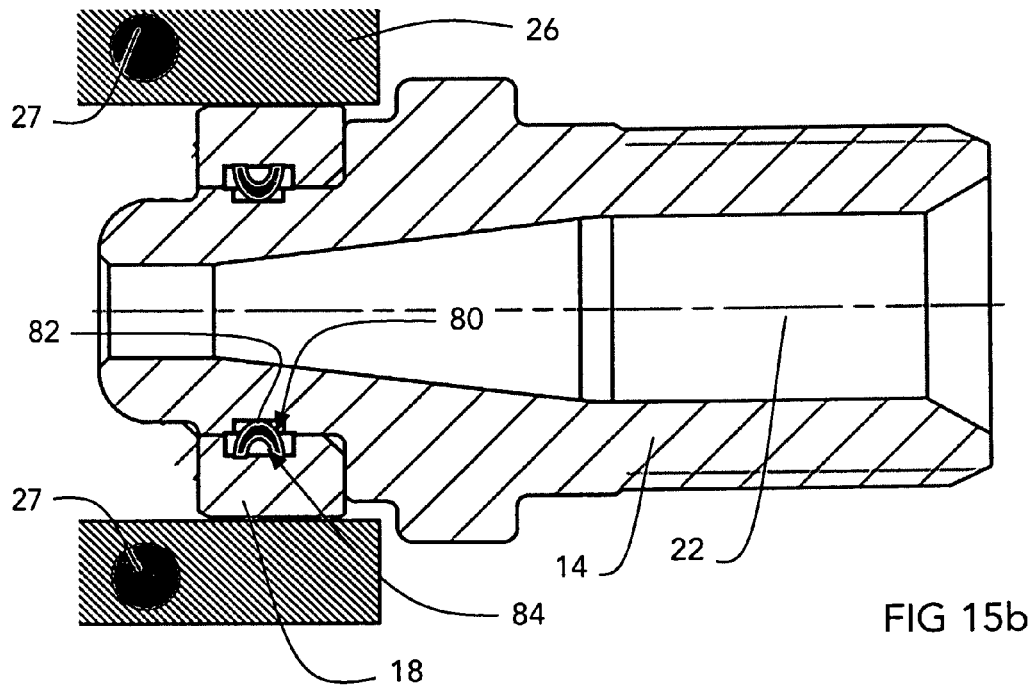

Referring to FIG. 15*a*, the tip seal 18 may have a groove 80 therein that receives an insulator member 82, which may also be a seal member, as with the embodiments shown in FIGS. 10-14. The insulator member 82 may be C-shaped. A corresponding groove 84 is provided in the nozzle tip 14. As shown in FIGS. 15*a* and 15*b*, the tip seal 18 may slide into place on the nozzle tip 14. As the seal 18 is slid onto the nozzle tip 14, the clearance between the two is sufficiently small to force the insulator member 82 to compress. As the seal 18 is slid into place such that the grooves 80 and 84 line up, the insulator member 82 expands into the groove 84 thereby providing an insulation function, a seal function providing the first "tip seal-nozzle tip" seal, and acting as a seal retainer to retain the tip seal 18 on the nozzle tip 14.

In FIGS. 15*a* and 15*ab* member 82 controls and provides a first annular sealing. When the tip seal 18 is slid over the member 82, the curvature of the ring 82 becomes flatter and may enter the corners of the inner grooves 84 and 80. By positioning the outer groove of the tip 14 closer to the shoulder we need to seal, the member 82 will apply a sealing force. If resin under pressure enters the chamber formed by grooves 84 and 80, more pressure will be applied on the seal ring 82 to generate the first annular seal.

In the embodiments shown herein, the tip seal 18 is provided on the nozzle tip 14 instead of being on the tip retainer 16. This is advantageous for several reasons. By providing the seal 18 on a smaller diameter element (i.e. the tip 14 as opposed to the larger diameter tip retainer 16) the reliability of the seal increases because there is a generally smaller area being sealed. Additionally, the overall diameter of the nozzle 11 is kept relatively smaller by mounting the seal 18 on the tip 14 instead of being on the tip retainer 16, which permits the pitch between nozzles 11 to be smaller, thereby permitting a greater number of articles to be molded on a machine, in some instances where the nozzle pitch is a limiting factor on the production capacity of the machine.

While the element 18 is referred to as a tip seal, it may be more broadly referred to as a mold component contacting piece.

In FIG. 1, two nozzles 11 are shown, one with a valve pin and one without. It will be noted that the two different nozzles are provided for illustrative purposes only, and that in practice, an injection molding machine may have all its nozzles including valve pins, or may have all of its nozzles without valve pins.

In any embodiments where a weld is provided between the seal retainer and the tip the weld is optional and may be a continuous weld or a point weld or a plurality of point welds.

The above-described embodiments of the invention are intended to be examples of the present invention and alterations and modifications may be effected thereto, by those of skill in the art, without departing from the scope of the invention which is defined solely by the claims appended hereto.

The invention claimed is:

1. A hot runner nozzle comprising:
   a hot runner nozzle body having a nozzle melt channel therethrough and having a nozzle body head portion;
   a nozzle heater coupled to the hot runner nozzle body;
   a nozzle tip having an outer surface and an nozzle tip melt channel, wherein the nozzle tip is made from a sintered metal matrix composite (MMC) powder material, the nozzle tip having a first coefficient of thermal conductivity and a first coefficient of thermal expansion at an operating temperature window between about 100 degrees C. and about 400 degrees C. provided by the nozzle heater, and wherein the nozzle tip is removably coupled to the hot runner nozzle body;
   a tip seal surrounding the nozzle tip and having an inner surface and an outer surface and is made from a sintered ceramic-based powder material, the tip seal having a second coefficient of thermal conductivity lower than the first coefficient of thermal conductivity and a second coefficient of thermal expansion that is at least equal to or lower than the first coefficient of thermal expansion at an operating temperature window between about 100 degrees C. and about 400 degrees C. provided by the heater, wherein the tip seal is removably coupled to the nozzle tip, and wherein the tip seal is configured to form a seal with a mold component having a mold gate adjacent to the nozzle tip;
   a seal retainer, wherein the seal retainer contacts both the nozzle tip and the tip seal, wherein the seal retainer is spaced from the mold component, and wherein the seal retainer is positioned onto the nozzle tip and removably couples the tip seal to the nozzle tip, and controls a first seal between the nozzle tip and the tip seal; and
   wherein the tip seal and seal retainer are separate components.

2. A hot runner nozzle according to claim 1, wherein the seal retainer is threadedly connected to the nozzle tip.

3. A hot runner nozzle according to claim 1, wherein the nozzle tip is threadedly connected to the hot runner nozzle body.

4. A hot runner nozzle according to claim 1, wherein the sintered metal matrix composite (MMC) powder material is a carbide, wherein the carbide includes tungsten in a proportion exceeding 50%.

5. A hot runner nozzle according to claim 1, wherein the sintered metal matrix composite (MMC) powder material has a coefficient of thermal expansion at 20-1000 C in the range of 4.00-6.00 $(\times 10^{-6} \text{ K}^{-1})$.

6. A hot runner nozzle according to claim 1, wherein the sintered metal matrix composite (MMC) powder material has a coefficient of thermal conductivity at 20 C in the range of (50-90) W/(m·K).

7. A hot runner nozzle according to claim 1, wherein the tip seal is made of a sintered ceramic-based powder material, wherein the sintered ceramic-based powder material includes zirconium oxide in a proportion in excess of 50%.

8. A hot runner nozzle according to claim 1, wherein the tip seal is made of a sintered ceramic-based powder material having a coefficient of thermal conductivity in the range of (12-15) W/(m·K).

9. A hot runner nozzle according to claim 1, wherein the tip seal is made of a sintered ceramic-based powder material having a coefficient of thermal expansion in the range of (2.5-7) $(\times 10^{-6} \text{ K}^{-1})$.

10. A hot runner nozzle according to claim 1, wherein the seal retainer drives an annular surface on the tip seal against an annular surface on the nozzle tip with a selected force to generate the first seal therebetween.

11. A hot runner nozzle according to claim 1, wherein the tip seal controls a second seal between a radially inner surface of the tip seal and a radially outer surface of the nozzle tip.

12. A hot runner nozzle comprising:
    a hot runner nozzle body having a nozzle melt channel therethrough and having a nozzle body head portion;
    a nozzle heater coupled to the hot runner nozzle body;
    a nozzle tip having an outer surface and an nozzle tip melt channel, wherein the nozzle tip is made from a first material, wherein the first material is wear resistant, wherein the nozzle tip has a first coefficient of thermal conductivity, and wherein the nozzle tip is removably coupled to the hot runner nozzle body;
    a tip seal surrounding the nozzle tip and having an inner surface and an outer surface, wherein the tip seal is made from a second material, wherein the second material comprises a sintered ceramic-based powder, wherein the tip seal has a second coefficient of thermal conductivity lower than the first coefficient of thermal conductivity, and wherein the tip seal is configured to form a seal with a mold component having a mold gate adjacent to the nozzle tip;
    a seal retainer made from a third material, wherein the seal retainer contacts both the nozzle tip and the tip seal, wherein the seal retainer is spaced from the mold component, wherein the seal retainer is positioned to removably retain the tip seal on the nozzle tip, and wherein the seal retainer controls a first seal between the nozzle tip and the tip seal; and
    wherein the tip seal and seal retainer are separate components.

13. A hot runner nozzle according to claim 12, wherein the seal retainer is threadedly connected to the nozzle tip.

14. A hot runner nozzle according to claim 12, wherein the nozzle tip is threadedly connected to the hot runner nozzle body.

15. A hot runner nozzle according to claim 12, wherein the first material comprises a carbide, wherein the carbide includes tungsten in a proportion exceeding 50%.

16. A hot runner nozzle according to claim 12, wherein the first material has a coefficient of thermal conductivity at 20 C in the range of (50-90) W/(m·K).

17. A hot runner nozzle according to claim 12, wherein the second material has a coefficient of thermal conductivity in the range of (12-15) W/(m·K).

18. A hot runner nozzle according to claim 12, wherein the seal retainer drives an annular surface on the tip seal against an annular surface on the nozzle tip with a selected force to generate the first seal therebetween.

19. A hot runner nozzle according to claim 12, wherein the tip seal controls a second seal between a radially inner surface of the tip seal and a radially outer surface of the nozzle tip.

* * * * *